(12) United States Patent
Niu et al.

(10) Patent No.: US 10,163,032 B2
(45) Date of Patent: Dec. 25, 2018

(54) ANISOTROPIC CONDUCTIVE FILM CUTTING CALIBRATION SYSTEM AND METHOD

(71) Applicants: BOE Technology Group Co., Ltd., Beijing (CN); Hefei Xinsheng Optoelectronics Technology Co., Ltd., Anhui (CN)

(72) Inventors: Honglin Niu, Beijing (CN); Xutong Chen, Beijing (CN); Guangfei Fan, Beijing (CN); Jinbao Zhang, Beijing (CN); Bin Wang, Beijing (CN); Yun Zhu, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 230 days.

(21) Appl. No.: 15/163,840

(22) Filed: May 25, 2016

(65) Prior Publication Data

US 2016/0358323 A1     Dec. 8, 2016

(30) Foreign Application Priority Data

Jun. 3, 2015   (CN) .......................... 2015 1 0299661

(51) Int. Cl.
*G06K 9/62*     (2006.01)
*B26D 5/00*     (2006.01)
(Continued)

(52) U.S. Cl.
CPC .......... *G06K 9/6201* (2013.01); *B26D 5/007* (2013.01); *B29C 55/005* (2013.01);
(Continued)

(58) Field of Classification Search
CPC ............... B26D 5/007; B29C 55/005; B29K 2105/256; B29K 2995/0005; B29L 2007/008; B29L 2031/3406; G06K 9/6201
(Continued)

(56) References Cited

U.S. PATENT DOCUMENTS 3,822,624 A *  7/1974  Shoji ........................ B26D 5/34
                                                83/208
4,974,164 A * 11/1990  Lewis .................... G01B 11/02
                                                33/1 L
(Continued)

FOREIGN PATENT DOCUMENTS

CN       2368670 Y     3/2000
CN       1263502 A     8/2000
(Continued)

OTHER PUBLICATIONS

Apr. 18, 2016—(CN)—First Office Action Appn 201510299661.3 English Tran.
(Continued)

*Primary Examiner* — Marnie A Matt
(74) *Attorney, Agent, or Firm* — Banner & Witcoff, Ltd.

(57) ABSTRACT

An anisotropic conductive film (ACF) cutting calibration system and method are disclosed, and the system includes: a cutter, configured to cut the ACF; an image acquisition device, configured to collect a cutting mark image of the ACF according to a predetermined period; a processing device, configured to compare the cutting mark image with a predetermined image, so as to determine an offset of a cutting mark in the cutting mark image with respect to a cutting mark in the predetermined image; and a drawing device, configured to draw the ACF and adjust a speed of drawing the ACF.

20 Claims, 3 Drawing Sheets

(51) Int. Cl.
*B29C 55/00* (2006.01)
*B29L 7/00* (2006.01)
*B29L 31/34* (2006.01)
*B29K 105/00* (2006.01)

(52) U.S. Cl.
CPC .............. *B29K 2105/256* (2013.01); *B29K 2995/0005* (2013.01); *B29L 2007/008* (2013.01); *B29L 2031/3406* (2013.01)

(58) Field of Classification Search
USPC ..................................................... 348/88
See application file for complete search history.

(56) References Cited

U.S. PATENT DOCUMENTS

| | | | |
|---|---|---|---|
| 5,690,316 | A | 11/1997 | Madjarac |
| 6,649,808 | B1* | 11/2003 | Tao .................. A61F 13/51401 604/370 |
| 6,721,060 | B1 | 4/2004 | Kawamura et al. |
| 2001/0007217 | A1* | 7/2001 | Wagner ................ B23D 25/02 83/37 |
| 2002/0166427 | A1* | 11/2002 | Wagner ................ B23D 25/02 83/37 |
| 2003/0178147 | A1* | 9/2003 | Kumakura ........... B65H 37/002 156/359 |
| 2004/0163562 | A1* | 8/2004 | Lewis, Jr. ........... B41F 33/0081 101/485 |
| 2005/0166744 | A1* | 8/2005 | Berge ..................... B26D 5/005 83/879 |
| 2005/0211031 | A1* | 9/2005 | James ..................... B26D 1/18 83/13 |
| 2009/0039772 | A1* | 2/2009 | Takashima ........ H01J 37/32541 313/504 |
| 2009/0229229 | A1* | 9/2009 | Tsuruta ..................... B65B 9/20 53/553 |
| 2010/0157557 | A1* | 6/2010 | Teng ...................... G02F 1/1345 361/777 |
| 2011/0249275 | A1* | 10/2011 | Lal .......................... G01B 11/25 356/622 |
| 2014/0011654 | A1* | 1/2014 | Maeda ................... B26D 1/085 493/369 |
| 2014/0332140 | A1* | 11/2014 | Chen ................... B32B 38/0004 156/73.3 |
| 2016/0046033 | A1* | 2/2016 | Zuech ................... B26D 5/007 700/127 |
| 2017/0003147 | A1* | 1/2017 | Yang .................. G01D 5/34746 |

FOREIGN PATENT DOCUMENTS

| | | | | |
|---|---|---|---|---|
| CN | 1303753 | A | 7/2001 | |
| EP | 0988998 | A1 * | 3/2000 | ............... B26D 7/27 |
| EP | 0988998 | A1 * | 3/2000 | ............... B26D 7/27 |

OTHER PUBLICATIONS

Jul. 11, 2016—(CN)—Second Office Action Appn 201510299661.3 with English Tran.

* cited by examiner

ANISOTROPIC CONDUCTIVE FILM CUTTING CALIBRATION SYSTEM AND METHOD

This application claims priority to and the benefit of Chinese Patent Application No. 201510299661.3 filed on Jun. 3, 2015, which application is incorporated herein in its entirety.

TECHNICAL FIELD

At least one embodiment of the present disclosure relates to an anisotropic conductive film cutting calibration system and an anisotropic conductive film cutting calibration method.

BACKGROUND

In the thin film technology field, a treatment process upon an ACF (anisotropic conductive film) comprises: during drawing/pulling an ACF via an ACF attachment device, cutting the ACF, and then attaching the cut ACF on a substrate. In the abovementioned treatment process, the unstableness of drawing the ACF and the abrasion upon the mechanisms will affect the cutting precision, resulting in that the area of the ACF obtained by cutting and the area of the substrate to be attached are inconsistent, thus the attachment precision is affected.

SUMMARY

At least one embodiment of the present disclosure provides an anisotropic conductive film cutting calibration system and method so as to improve the drawing precision of the anisotropic conductive film.

At least one embodiment of the present disclosure provides an anisotropic conductive film cutting calibration system, which comprises: a cutter, configured to cut an anisotropic conductive film; an image acquisition device, configured to collect a cutting mark image of the anisotropic conductive film according to a predetermined period; a processing device, configured to compare the cutting mark image with a predetermined image, so as to determine an offset of a cutting mark in the cutting mark image with respect to a cutting mark in the predetermined image; and a drawing device, configured to draw the anisotropic conductive film, and adjust a speed of drawing the anisotropic conductive film.

At least one embodiment of the present disclosure further provides an anisotropic conductive film cutting calibration method, comprising: collecting a cutting mark image of an anisotropic conductive film according to a predetermined period; comparing the cutting mark image with a predetermined image, so as to determine an offset of a cutting mark in the cutting mark image from a cutting image in the predetermined image; and adjusting a speed of drawing the anisotropic conductive film according to the offset.

BRIEF DESCRIPTION OF THE DRAWINGS

In order to illustrate the technical solutions in the embodiments of the present disclosure more clearly, the accompanying drawings of the embodiments will be briefly described in the following; it is apparent that the drawings described below are only related to some embodiments of the present disclosure, and thus are not limitative of the disclosure.

DETAILED DESCRIPTION

Figure 1:
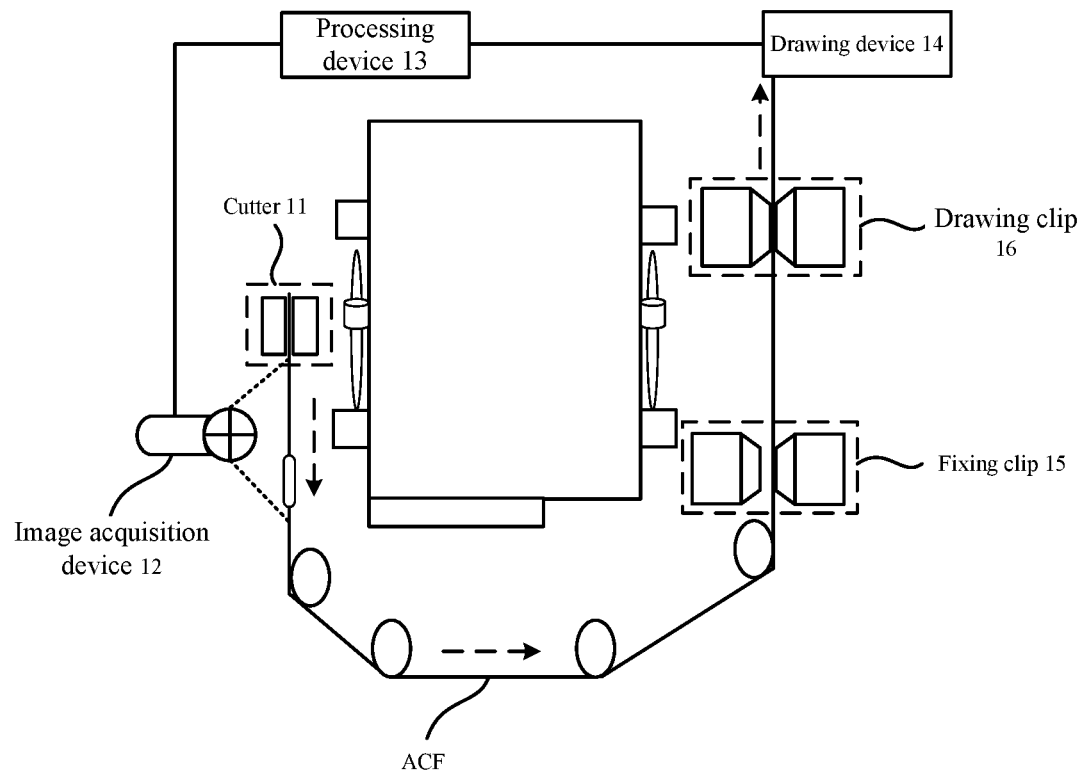
FIG. 1 is a structural schematic diagram of an anisotropic conductive film cutting calibration system according to an embodiment of the present disclosure.

In order to illustrate the purposes, technical solutions and advantages of the embodiments of the present disclosure more clearly, the technical solutions of the embodiments of the present disclosure will be described in a clearly and fully understandable way in connection with the accompanying drawings of the embodiments of the present disclosure. Apparently, the described embodiments are just a part but not all of the embodiments of the present disclosure. Based on the described embodiments of the present disclosure, the other embodiments obtained by those skilled in the art without paying inventive labor should be within the scope of the present disclosure.

With regard to the problem that the unstableness of drawing the ACF and the abrasion upon the mechanism affect the attachment precision, a solution is to increase the surface rubbing force between a fixing clip and an drawing clip in the ACF attachment device, or directly replace a chuck in the ACF attachment device so as to stably draw the ACF, so as to improve the attachment precision. However, in research the inventors of the present application have noted that the solution is difficult to operate, has suffered from great costs and cannot largely improve the drawing precision of the ACF.

As illustrated by FIG. 1, an anisotropic conductive film (hereafter, for the simplicity of the description, ACF is used to represent an anisotropic conductive film) cutting calibration system according to an embodiment of the present disclosure comprises: a cutter 11, which is configured to cut an ACF; an image acquisition device 12, which is configured to collect a cutting mark image of the ACF according to a predetermined period; a processing device 13, which is configured to compare the cutting mark image with a predetermined image, so as to determine an offset of a cutting mark in the cutting mark image with respect to a cutting mark in the predetermined image; and a drawing device 14, which is configured to draw/pull the ACF and adjust the speed of drawing the ACF according to the offset.

An ACF typically includes a film as a base substrate and a layer of adhesive (adhesive body) coated on the film, and the ACF may be stored by winding in a form of roll. The cutter 11 will cut apart the adhesive body of the surface of the ACF but does not cut the film under the adhesive body, such that, the ACF will not be cut off (broken), and only a cutting mark will be left on the surface of the ACF. For example, the cutting frequency of the cutter 11 may be fixed, thus, and a predetermined period can be set, so as to ensure that each cutting mark image collected by the image acquisition device 12 will comprise a cutting mark. If the processing device 13 does not detect a cutting mark in the cutting mark image, which demonstrates that the offset of cutting is too large, showing a level of equipment failure, and it is necessary to send out the alarm. Hereafter, the present disclosure will be merely described with regard to the cases where the cutting mark image comprises a cutting mark. For example, the cutter may be a cutting knife or other conventional cutting tool(s) in the related technical field.

After receiving the offset Δx of the cutting mark in the cutting mark image with respect to the cutting mark in the predetermined image, the drawing device 14 acquires a distance S between the cutting mark in the predetermined image and the cutter 11 and the present drawing speed $v_1$ of the drawing device 14, wherein S has been determined upon the predetermined image is set/selected, while $v_1$ can be directly acquired. The offset Δx is judged to be a positive or negative value, and if the offset Δx is positive, it can be determined that the present drawing speed $v_1$ of the drawing device 14 is faster than the drawing speed $v_0$ for forming the cutting mark in the predetermined image, thus, it is necessary to lower the drawing speed $v_1$, and the lowering amount is $v_1 \Delta x/(S+\Delta x)$, so as to make the lowered speed trend to $v_0$, and the specific reasoning procedure is provided as follows:

Because the predetermined periods for forming the cutting mark in the cutting mark image and the cutting mark in the predetermined image are identical, it can be determined that:

$$S/v_0=(S+\Delta x)/v_1, \text{ i.e., } v_0=Sv_1/(S+\Delta x)$$

Moreover, the present drawing speed $v_1$ of the drawing device 14 is faster than the drawing speed $v_0$ for forming the cutting mark in the predetermined image, thus, it is necessary to lower $v_1$, i.e., the lowering amount is:

$$\Delta v = v_1 - v_0 = v_1 - Sv_1/(S+\Delta x) = v_1 \Delta x/(S+\Delta x)$$

In the same way, if the offset Δx is negative, it can be determined that the present drawing speed $v_1$ of the drawing device 14 is slower than the drawing speed $v_0$ for forming the cutting mark in the predetermined image, thus, it is necessary to raise the drawing speed $v_1$, and the raising amount is $v_1 \Delta x/(S-\Delta x)$, so as to make the raised speed trend to $v_0$, and the specific reasoning procedure is provided as follows:

Because the predetermined periods for forming the cutting mark in the cutting mark image and the cutting mark in the predetermined image are identical, it can be determined that:

$$S/v_0=(S-\Delta x)/v_1, \text{ i.e., } v_0=Sv_1/(S-\Delta x)$$

Moreover, the present drawing speed $v_1$ of the drawing device 14 is slower than the drawing speed $v_0$ for forming the cutting mark in the predetermined image, thus, it is necessary to raise $v_1$, i.e., the raising amount is:

$$\Delta v = v_1 - v_0 = v_1 - Sv_1/(S-\Delta x) = v_1 \Delta x/(S-\Delta x)$$

The drawing speed of the drawing device 14 and the predetermined drawing speed (i.e., $v_0$) can be ensured to be consistent with each other by automatically adjusting the drawing speed of the drawing device 14 with respect to the ACF during the process in which the cutter 11 cuts the ACF, so as to ensure that the distances between the cutting marks caused by the cutter 14 on the ACF are same and consistent with each other, so that, the area of cut ACFs can correspond to the area of substrates, and the cut ACFs can be attached on the substrates at a high precision.

For example, the ACF cutting calibration system may further comprise a fixing clip 15 and a drawing clip 16, the drawing device 14 may adjust the drawing speed by controlling the fixing clip 15 (also called as a fixing clip plate) and the drawing clip 16 (also called as a drawing clip plate).

Figure 2:
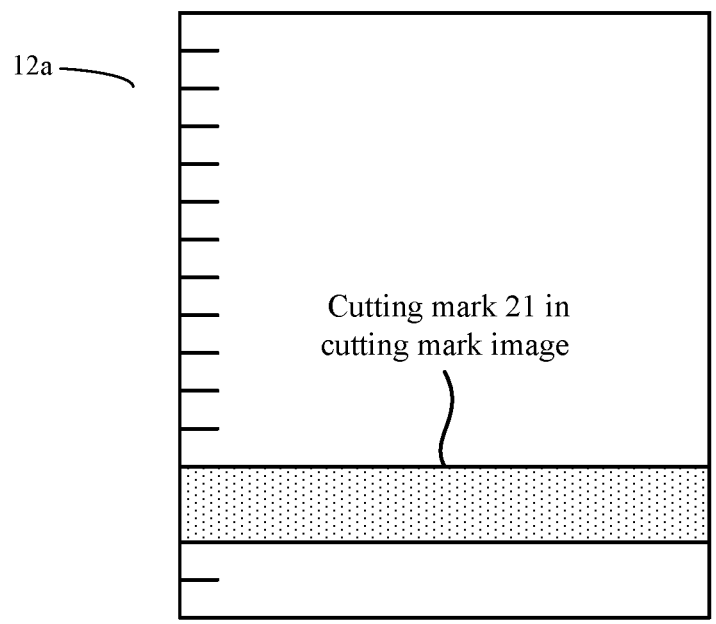
FIG. 2 is a schematic diagram of the relationship between a cutting mark and a scale ruler in a cutting mark image provided by an embodiment of the present disclosure.
Figure 3:
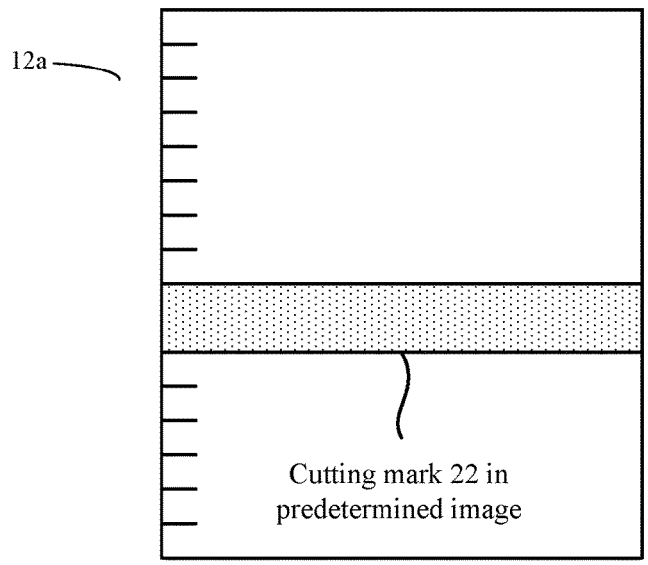
FIG. 3 is a schematic diagram of the relationship between a cutting mark and a scale ruler in a predetermined image provided by an embodiment of the present disclosure.

For example, as illustrated by FIGS. 2 and 3, the image acquisition device 12 is provided with a scale ruler 12a, the cutting mark 21 in the cutting mark image and the scale ruler 12a have a first relationship therebetween, and the cutting mark 22 in the predetermined image and the scale ruler 12a have a second relationship therebetween; the processing device 13 compares the first relationship with the second relationship so as to determine the offset.

For example, the scale ruler may be disposed on a camera lens or a photographic plate of the image acquisition device 12. As illustrated by FIG. 2, the scale ruler 12a may be located at a side of an acquired image, and may further comprise scale so as to be artificially recognized/viewed by a user according to the requirements; in the scale, the distance between the adjacent scale lines is 1 mm, and the cutting mark 21 in the cutting mark image is located between the second scale line and the fourth scale line. As illustrated by FIG. 3, the cutting mark 22 in the predetermined image is located between the sixth scale line and the eighth scale line. In the comparison of FIG. 2 and FIG. 3, it can be seen that the cutting mark 22 in the cutting mark image is 4 mm in advance than the cutting mark 22 in the predetermined image, that is, the offset Δx is positive, specifically, 4 mm.

The offset of the cutting mark in the cutting mark image with respect to the cutting mark in the predetermined image can be determined according to the scale in the scale ruler by disposing a scale ruler, so that the speed needed to be adjusted of the drawing device 14 can be precisely calculated.

Figure 4:
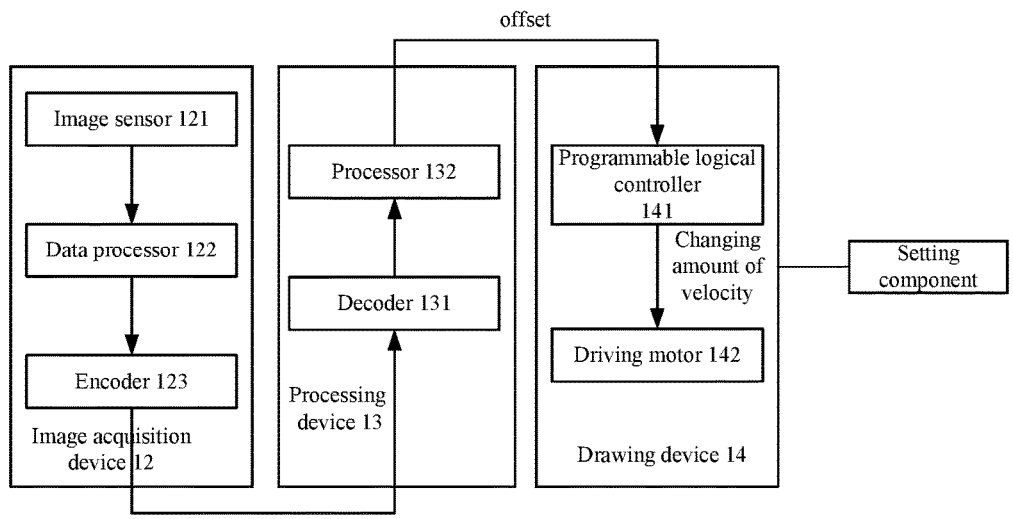
FIG. 4 is a schematic diagram of the signal flow provided by an embodiment of the present disclosure.

As illustrated by FIG. 4, for example, the image acquisition device 12 comprises: an image sensor 121, which is configured to collect a cutting mark image according a predetermined period; a data processor 122, which is configured to generate a scale ruler in the cutting mark image, and determine the first relationship between the cutting mark in the cutting mark image and the scale ruler, the cutting mark in the predetermined image and the scale ruler have a second relationship, and the processing device 13 compares the first relationship with the second relationship so as to determine the offset.

In an embodiment, the scale ruler is attached or inserted by the image acquisition device 12 after collecting a cutting mark image, without the scale ruler being directly disposed in the image acquisition device 12, thus the transformations of the substance hardware(s) can be avoided and cost can be lower.

For example, the image acquisition device 12 is further configured to encode the cutting mark image, for example, via an encoder 123, and the processing device can be further configured to decode the encoded cutting image, for example, via a decoder 131. The decoded data may be input in a processor 132, and the processor 132 acquires the offset by comparing the first relationship with the second relationship.

For example, the drawing device 14 comprises: a programmable logical controller 141, configured to perform logical calculation on the offset, so as to obtain a change amount of the drawing speed; and a driving motor, configured to adjust the speed of drawing the ACF according to the change amount of the drawing speed.

The processor 132 delivers the offset to the programmable logical controller 141 of the drawing device 14, and the programmable logical controller 141 acquires the change amount of the drawing speed through logical calculation and delivers the change amount of the drawing speed to the driving motor 142 to change the power of the driving motor 142, so as to finally realize the adjustment of the drawing speed. Programmable logic controller 141 can be simple for programming and easy to use and implement, and has strong adaptability and high performance price ratio.

For example, as illustrated by FIG. 4, the ACF cutting calibration system provided by at least one embodiment of the present disclosure further comprises: a setting component, which is configured to set the predetermined period and/or a correction precision according to a received instruction. In this case, if the offset of the drawing device 14 is larger or equal to the correction precision, the speed of drawing the ACF will be adjusted. Such that, the drawing speed will be adjusted only upon the offset being too large, which can avoid the excessive loss of the motor due to frequent adjustments.

For example, the setting component may be embodied via a processor, a programmable logical controller, or other calculation components.

For example, the processing device 13 raises the alarm upon no cutting mark being detected in the cutting mark image. If the processing device 13 does not detect a cutting mark in the cutting mark image, the result shows that the offset of cutting is too large, which belong to a level of equipment failure, and it is necessary to raise the alarm.

Figure 5:
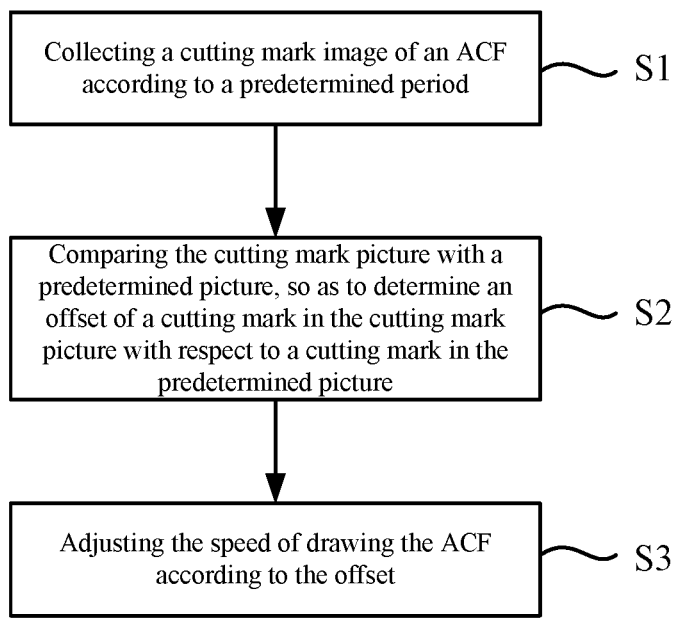
FIG. 5 is a flow schematic diagram of an anisotropic conductive film cutting calibration method according to an embodiment of the present disclosure.

As illustrated by FIG. 5, an ACF cutting calibration method according to an embodiment of the present disclosure comprises: collecting a cutting mark image of an ACF according to a predetermined period; comparing the cutting mark image with a predetermined image, so as to determine an offset of a cutting mark in the cutting mark image from a cutting image in the predetermined image; and, adjusting the speed of drawing the anisotropic conductive film according to the offset.

For example, the operation of collecting a cutting mark image comprises: generating a scale ruler in the cutting mark image, and determining a first relationship between the cutting mark in the cutting mark image and the scale ruler.

In the method provided by the embodiment of the present disclosure, the cutting mark in the predetermined image and the scale ruler have a second relationship, in this case, the operation of determining the offset comprises: comparing the first relationship with the second relationship so as to determine the offset.

For example, the operation of collecting a cutting mark image further comprises: encoding the cutting mark image, in this case, the operation of determining the offset further comprises: decoding the encoded cutting image.

For example, the method provided by at least one embodiment of the present disclosure further comprises: setting the predetermined period and/or a correction precision, in this case, the operation of determining the offset further comprises: adjusting the speed of drawing the anisotropic conductive film if the offset is larger or equal to the correction precision.

The embodiments of the present disclosure are described in detail with reference to the accompanying drawings; a common technology of drawing ACF is difficult to operate, has expensive costs and cannot largely improve the drawing precision of the ACF. However, in an embodiments of the present disclosure, the drawing speed of the drawing device and the predetermined drawing speed can be ensured to be consistent with each other by automatically adjusting the drawing speed of the drawing device to the ACF during the process that the cutter 11 cuts the ACF, so as to ensure that the distances between the cutting marks caused by the cutter on the ACF are same, so that, the area of the cut ACF can correspond to the area of a substrate, and the cut ACF can be attached on the substrate very well.

In the embodiments of the present disclosure, terms "first", "second", "third", and "fourth" are not intended to indicate or imply any importance, but merely used for description purposes. The term "plurality" refers to two or more than two, unless otherwise defined.

The foregoing are merely specific embodiments of the disclosure, but not limitative to the protection scope of the disclosure. Thus, the protection scope of the disclosure shall be defined by the accompanying claims.

The present disclosure claims the benefits of Chinese patent application No. 201510299661.3, which was filed with the SIPO on Jun. 3, 2015 and is fully incorporated herein by reference as part of this application.

What is claimed is:

1. An anisotropic conductive film cutting calibration system, comprising:
   a cutter, configured to cut an anisotropic conductive film;
   an image acquisition device, configured to acquire a cutting mark image of the anisotropic conductive film according to a predetermined period;
   a processing device, comprising a processor which is configured to compare the cutting mark image with a predetermined image, so as to determine an offset of a cutting mark in the cutting mark image with respect to a cutting mark in the predetermined image; and
   a drawing device, configured to draw the anisotropic conductive film and adjust a speed of drawing the anisotropic conductive film according to the offset.

2. The anisotropic conductive film cutting calibration system according to claim 1, wherein the image acquisition device is provided with a scale ruler, the cutting mark in the cutting mark image has a first relationship with the scale ruler, the cutting mark in the predetermined image has a second relationship with the scale ruler, and the processor is further configured to compare the first relationship with the second relationship, so as to determine the offset.

3. The anisotropic conductive film cutting calibration system according to claim 1, wherein the image acquisition device comprises: an image sensor, configured to collect the cutting mark image according to the predetermined period.

4. The anisotropic conductive film cutting calibration system according to claim 3, wherein the image acquisition device further comprises:
   a data processor, configured to generate a scale ruler in the cutting mark image, and determine a first relationship between the cutting mark in the cutting mark image and the scale ruler,
   wherein the cutting mark in the predetermined image has a second relationship with the scale ruler, and
   wherein the processor compares the first relationship with the second relationship, so as to determine the offset.

5. The anisotropic conductive film cutting calibration system according to claim 1, wherein
   the image acquisition device comprises a data processor, configured to generate a scale ruler in the cutting mark image and determine a first relationship between the cutting mark in the cutting mark image and the scale ruler;
   the cutting mark in the predetermined image has a second relationship with the scale ruler; and
   the processor compares the first relationship with the second relationship, so as to determine the offset.

6. An anisotropic conductive film cutting calibration system, comprising:
   a cutter, configured to cut an anisotropic conductive film;
   an image acquisition device, configured to acquire a cutting mark image of the anisotropic conductive film according to a predetermined period;

a processing device, comprising a processor which is configured to compare the cutting mark image with a predetermined image, so as to determine an offset of a cutting mark in the cutting mark image with respect to a cutting mark in the predetermined image; and a drawing device, configured to draw the anisotropic conductive film and adjust a speed of drawing the anisotropic conductive film according to the offset, wherein the image acquisition device comprises:
an image sensor, configured to collect the cutting mark image according to the predetermined period; and
an encoder, wherein the encoder is configured to encode the cutting mark image, and
wherein the processing device comprises a decoder, and the decoder is configured to decode the encoded cutting mark image.

7. The anisotropic conductive film cutting calibration system according to claim 4, wherein the image acquisition device comprises an encoder and the encoder is configured to encode the cutting mark image, and wherein the processor comprises a decoder, and the decoder is configured to decode the encoded cutting mark image.

8. The anisotropic conductive film cutting calibration system according to claim 1, wherein the drawing device comprises:
a programmable logical controller, configured to perform logical calculation on the offset, so as to obtain a change amount of the drawing speed.

9. The anisotropic conductive film cutting calibration system according to claim 8, wherein the drawing device further comprises:
a driving motor, configured to adjust the speed of drawing the anisotropic conductive film according to the change amount of the drawing speed.

10. The anisotropic conductive film cutting calibration system according to claim 1, wherein the drawing device comprises a driving motor, which is configured to adjust the speed of drawing the anisotropic conductive film according to a change amount of the drawing speed.

11. The anisotropic conductive film cutting calibration system according to claim 1, further comprising:
a setting component, configured to set the predetermined period and/or a correction precision according to a received instruction,
wherein the drawing device adjusts the speed of drawing the anisotropic conductive film if the offset is larger or equal to the correction precision.

12. The anisotropic conductive film cutting calibration system according to claim 2, further comprising:
a setting component, configured to set the predetermined period and/or a correction precision according to a received instruction,
wherein the drawing device adjusts the speed of drawing the anisotropic conductive film if the offset is larger or equal to the correction precision.

13. The anisotropic conductive film cutting calibration system according to claim 3, further comprising:
a setting component, configured to set the predetermined period and/or a correction precision according to a received instruction,
wherein the drawing device adjusts the speed of drawing the anisotropic conductive film if the offset is larger or equal to the correction precision.

14. The anisotropic conductive film cutting calibration system according to claim 4, further comprising:
a setting component, configured to set the predetermined period and/or a correction precision according to a received instruction,
wherein the drawing device adjusts the speed of drawing the anisotropic conductive film if the offset is larger or equal to the correction precision.

15. The anisotropic conductive film cutting calibration system according to claim 5, further comprising:
a setting component, configured to set the predetermined period and/or a correction precision according to a received instruction,
wherein the drawing device adjusts the speed of drawing the anisotropic conductive film if the offset is larger or equal to the correction precision.

16. The anisotropic conductive film cutting calibration system according to claim 1, wherein the processor delivers notice information if no cutting mark is detected in the cutting mark image.

17. An anisotropic conductive film cutting calibration method, comprising:
collecting a cutting mark image of an anisotropic conductive film according to a predetermined period;
comparing the cutting mark image with a predetermined image, so as to determine an offset of a cutting mark in the cutting mark image from a cutting mark in the predetermined image; and
adjusting a speed of drawing the anisotropic conductive film according to the offset.

18. The anisotropic conductive film cutting calibration method according to claim 17, further comprising:
generating a scale ruler in the cutting mark image, and
determining a first relationship between the cutting mark in the cutting mark image and the scale ruler, wherein the cutting mark in the predetermined image has a second relationship with the scale ruler, and operation of determining the offset comprises: comparing the first relationship with the second relationship so as to determine the offset.

19. The anisotropic conductive film cutting calibration method according to claim 17, further comprising:
setting the predetermined period and/or a correction precision according to a received instruction; and
adjusting the speed of drawing the anisotropic conductive film if the offset is larger or equal to the correction precision.

20. The anisotropic conductive film cutting calibration method according to claim 18, further comprising:
setting the predetermined period and/or a correction precision according to a received instruction; and
adjusting the speed of drawing the anisotropic conductive film if the offset is larger or equal to the correction precision.

* * * * *